(No Model.) 5 Sheets—Sheet 1.

T. J. HOGAN.
AIR BRAKE.

No. 551,767. Patented Dec. 24, 1895.

WITNESSES:
Chas. F. Miller
F. E. Gaither

INVENTOR,
Thomas J. Hogan
by J. Marden Bell
Att'y.

(No Model.) 5 Sheets—Sheet 2.

T. J. HOGAN.
AIR BRAKE.

No. 551,767. Patented Dec. 24, 1895.

WITNESSES: Chas. F. Miller, F. E. Gaither

INVENTOR, Thomas J. Hogan
by J. Snowden Bell, Att'y.

(No Model.) 5 Sheets—Sheet 3.

T. J. HOGAN.
AIR BRAKE.

No. 551,767. Patented Dec. 24, 1895.

WITNESSES:
Chas. F. Miller.
F. E. Gaither

INVENTOR
Thomas J. Hogan
by J. Snowden Bell,
Att'y.

(No Model.) 5 Sheets—Sheet 4.
T. J. HOGAN.
AIR BRAKE.

No. 551,767. Patented Dec. 24, 1895.

WITNESSES:
Chas. F. Miller.
F. E. Gaither.

INVENTOR,
Thomas J. Hogan
by Snowden Bell
Att'y.

(No Model.) 5 Sheets—Sheet 5.

T. J. HOGAN.
AIR BRAKE.

No. 551,767. Patented Dec. 24, 1895.

WITNESSES:
Chas. F. Miller
F. E. Gaither

INVENTOR,
Thomas J. Hogan,
by J. Snowden Bell,
Att'y.

UNITED STATES PATENT OFFICE.

THOMAS J. HOGAN, OF PITTSBURG, ASSIGNOR TO THE WESTINGHOUSE AIR BRAKE COMPANY, OF WILMERDING, PENNSYLVANIA.

AIR-BRAKE.

SPECIFICATION forming part of Letters Patent No. 551,767, dated December 24, 1895.

Application filed August 15, 1895. Serial No. 559,314. (No model.)

*To all whom it may concern:*

Be it known that I, THOMAS J. HOGAN, a citizen of the United States, residing at Pittsburg, in the county of Allegheny and State of Pennsylvania, have invented or discovered certain new and useful Improvements in Air-Brakes, of which improvements the following is a specification.

The object of my invention is to provide an improvement in automatic fluid-pressure brakes for railway-cars; and to this end it consists in an improved means for effecting a local release of fluid under pressure from the train-pipe and thereby obtaining a quick, powerful, and simultaneous application of the brakes in cases of emergency; in means whereby the brake-cylinder may be closed to the atmosphere and the brakes applied independently of the movement of the triple-valve piston, or in case the triple-valve piston fails to operate, and in certain combinations and details of construction which will be hereinafter more fully set forth.

Figure 1:
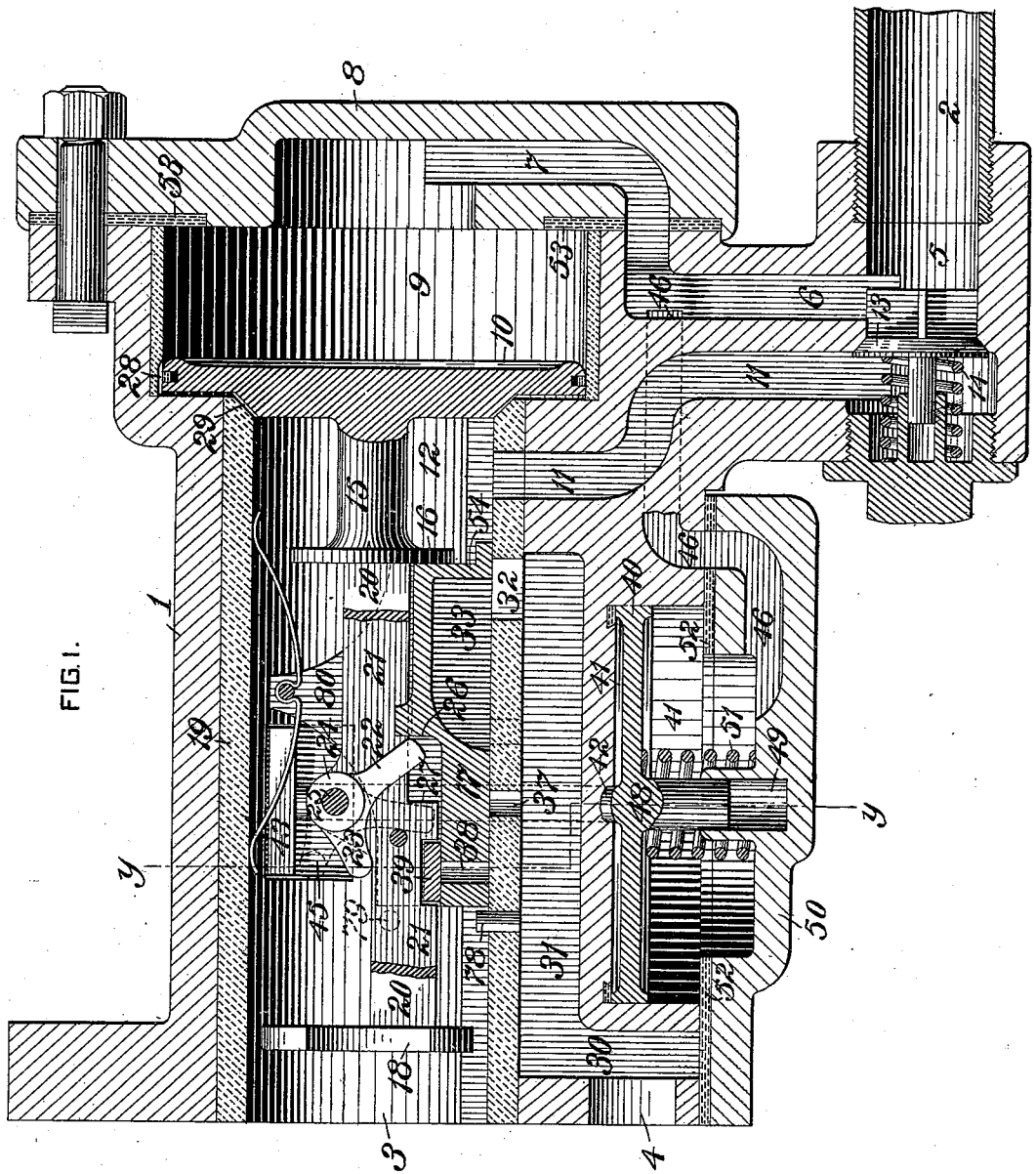
Figure 2:
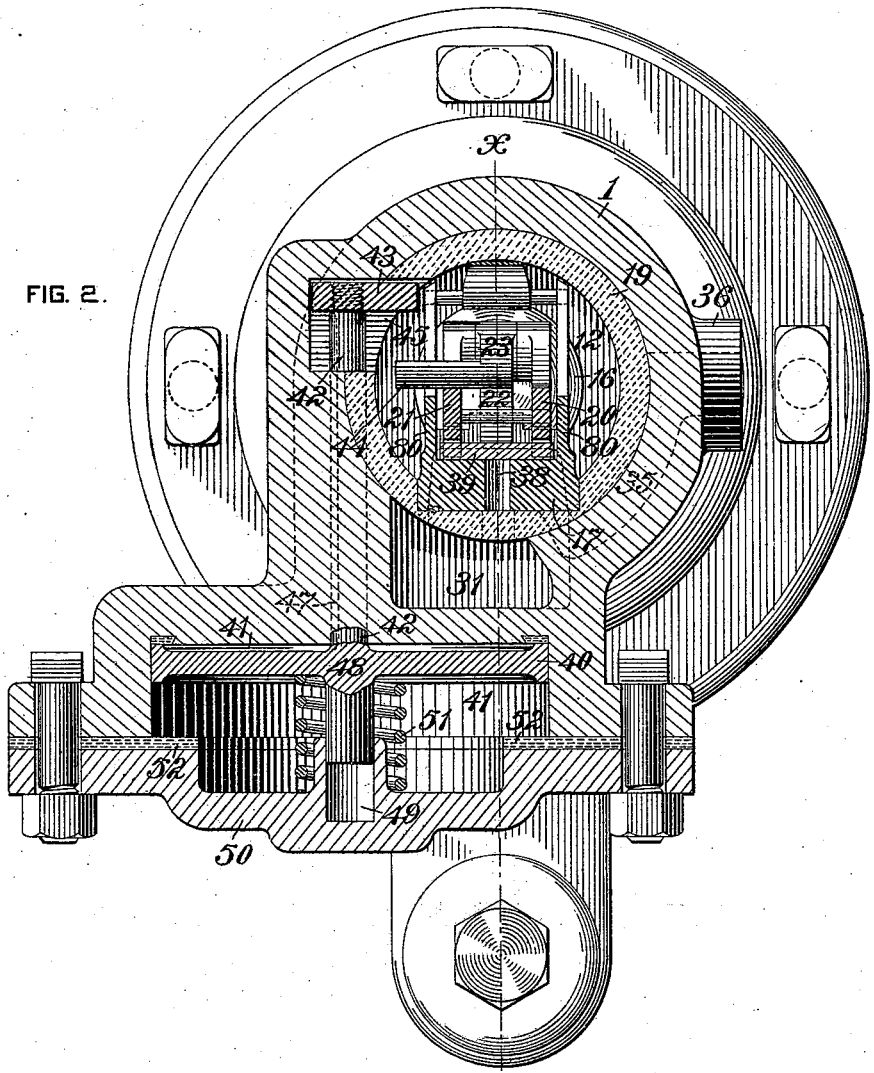
Figure 3:
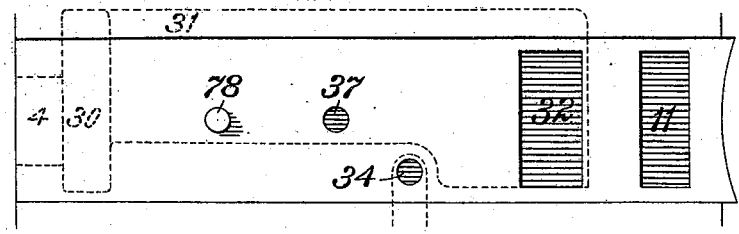
Figure 4:
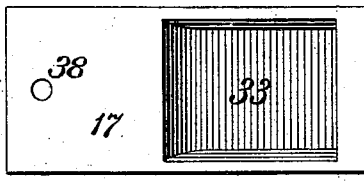
Figures 5, 6:
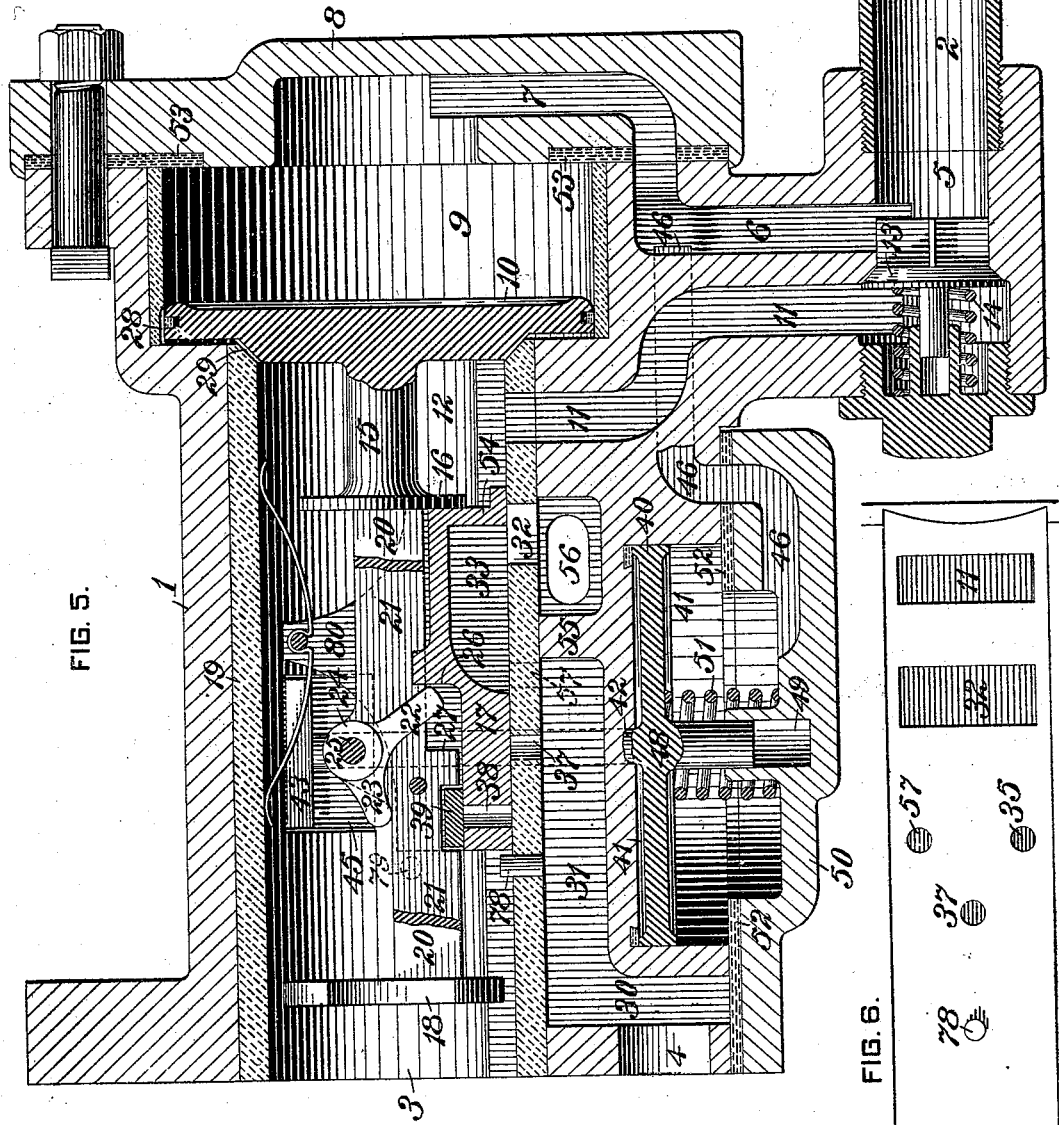
Figure 7:
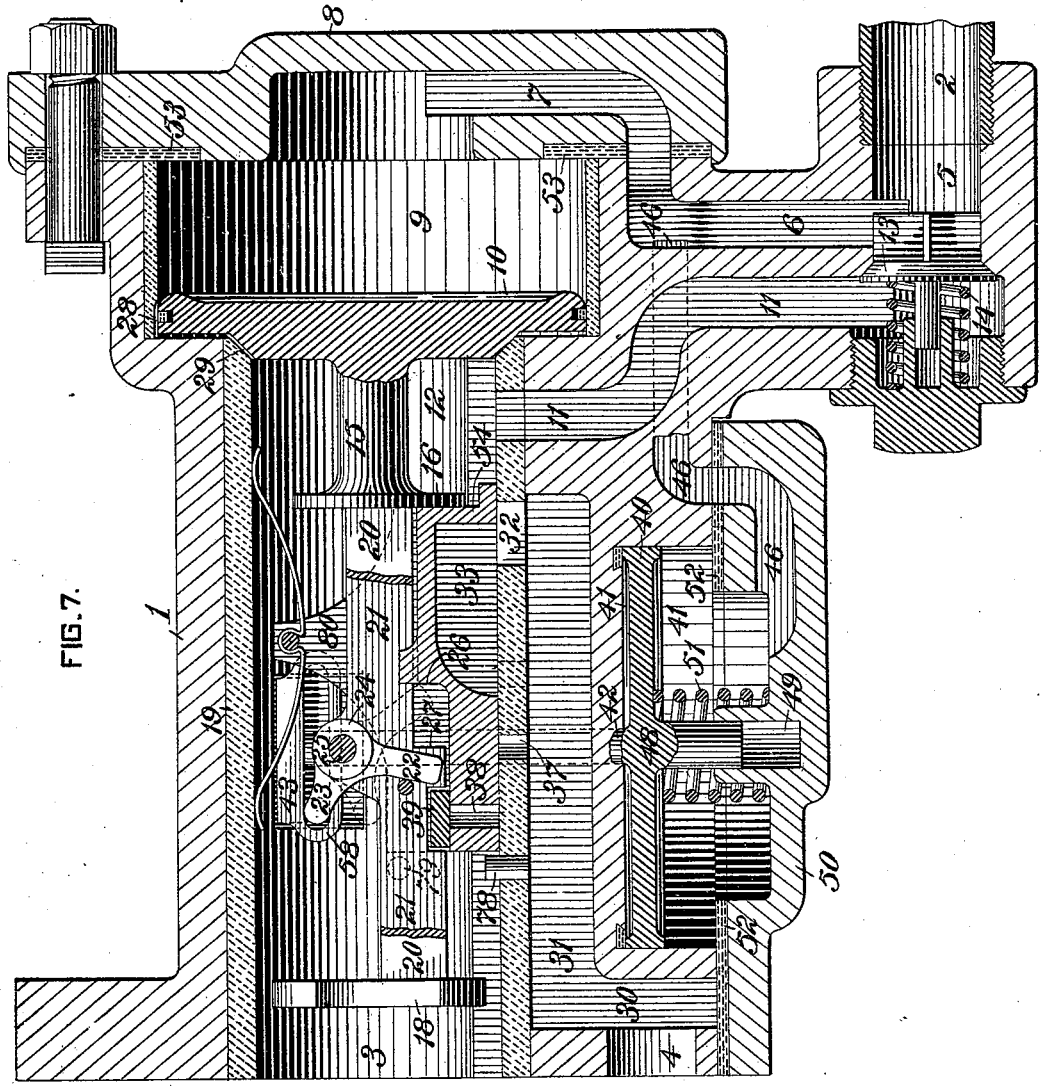
Figure 8:
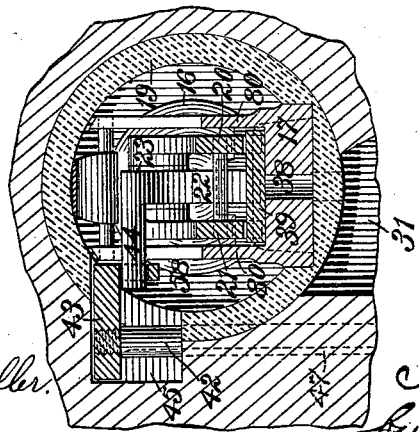
Figure 9:
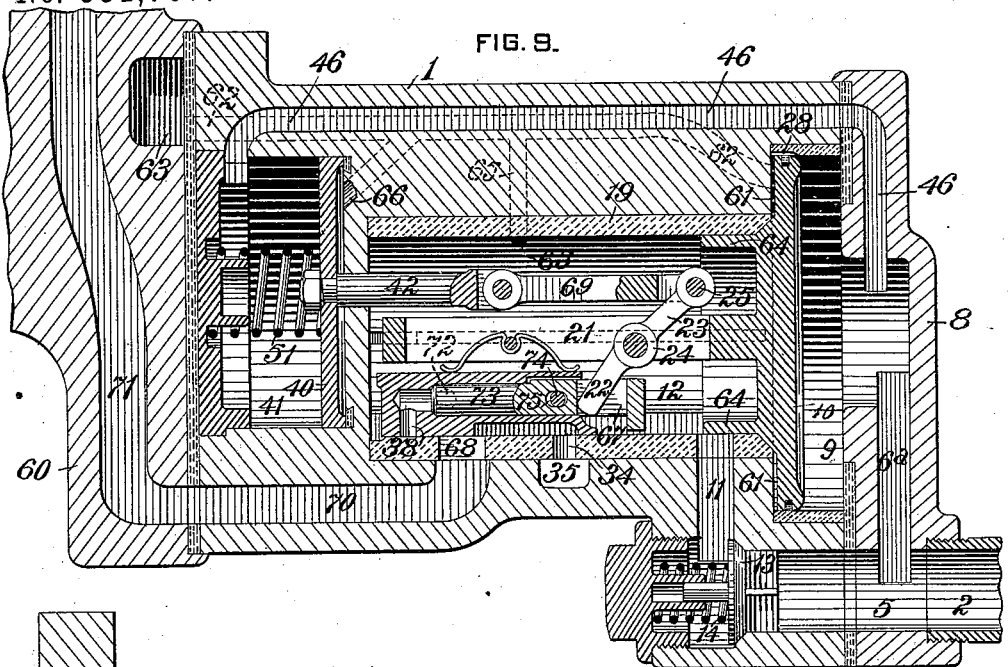
Figure 10:
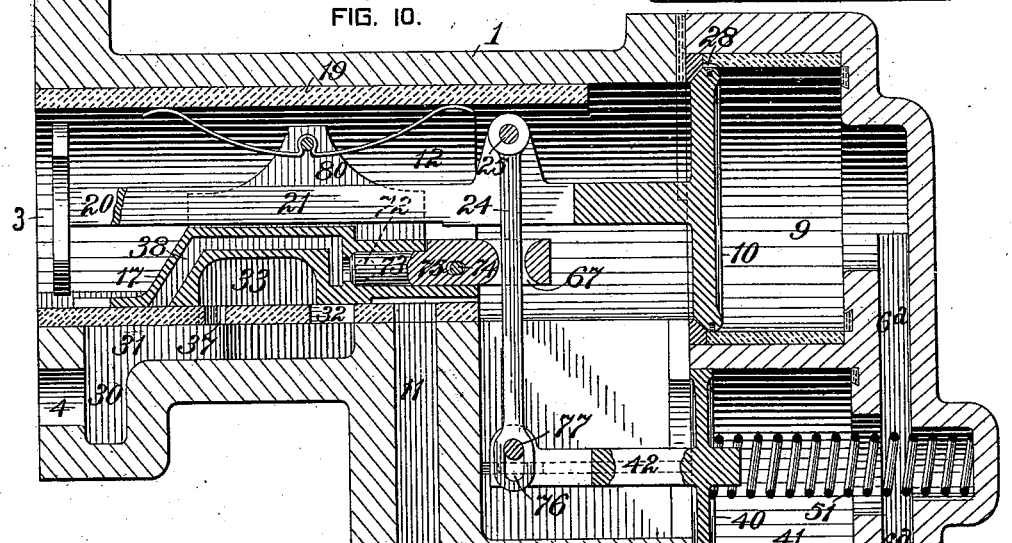
Figure 11:
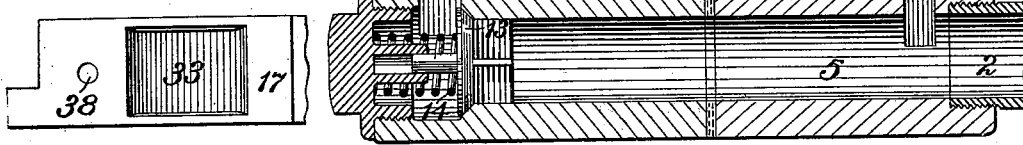
Figure 12:
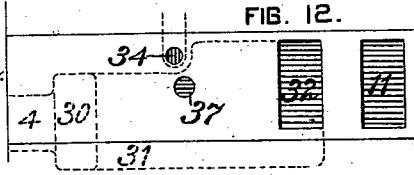

In the accompanying drawings, Figure 1 is a section through a triple-valve device on the line $x\,x$ of Fig. 2, illustrating an application of my invention; Fig. 2, a transverse section on the line $y\,y$ of Fig. 1; Fig. 3, a plan view of the seat of the main valve of the triple-valve device shown in Figs. 1 and 2; Fig. 4, a plan view of the face of the main valve of the triple-valve device shown in Figs. 1 and 2; Fig. 5, a section similar to Fig. 1, showing a modification by which the fluid from the train-pipe may be released to the atmosphere; Fig. 6, a plan view of the main-valve seat shown in Fig. 5; Figs. 7 and 8, longitudinal and transverse sections showing a construction substantially the same as that shown in Figs. 1 and 2, except that in Figs. 7 and 8 the lever is connected to the stem of the supplemental piston by means of a yoke; Fig. 9, a longitudinal section through a triple-valve device of a somewhat different construction from that shown in Figs. 1, 5, and 7, showing the lever connected to the supplemental piston by means of a link; Fig. 10, a similar section showing still another form of triple-valve device, in which the supplemental piston is so located as to move in the same direction as the triple-valve piston in making an emergency application of the brakes; Fig. 11, a view of the face of the main valve shown in Fig. 10, and Fig. 12 a plan view of the seat of the main valve shown in Fig. 10.

The casing 1 of the triple-valve device shown in Figs. 1 to 8 is connected, either directly or by means of a branch pipe 2, with the train-pipe, and is provided with openings or passages 3 and 4, which communicate with an auxiliary reservoir and with a brake-cylinder, respectively. Passages 5 and 6 in the casing 1 and a passage 7 in the cap 8 connect the pipe 2 with a piston-chamber 9, in which the triple-valve piston 10 is fitted to work. A passage 11 leads from the train-pipe to the main-valve chamber 12, but communication between the chamber 12 and the train-pipe through the passage 11 is normally closed by means of a check-valve 13, which seats toward the train-pipe and is acted on by a spring 14 tending to hold it to its seat.

The stem 15 of the triple-valve piston is provided with a shoulder or collar 16, which is adapted to abut against one end of the main valve 17, whereby the valve 17 may be moved to the left by the main piston 10 in releasing the brakes. An extension of the stem 15 to the left and beyond the collar 16 is provided with a guide 18, which is fitted in the bushing 19 so as to prevent lateral movement of the stem, particularly in a vertical direction or toward the seat of the slide-valve 17. If preferred, the extension of the stem may be provided with a cylindrical end fitted to work in a guide, or the guide 18 may extend downward to the seat of the slide-valve 17 and slide thereon.

That portion of the main piston-stem between the collar 16 and the guide 18 may be given any preferred form; but, as shown in the drawings, it consists of two parallel bars 20 and 21, between which is pivoted a lever 24, provided with arms 22 and 23. The lever is pivoted to the bars 20 and 21, so as to swing freely between them, by means of a pin 25, whose ends are fitted in the bars.

The main slide-valve is provided with a shoulder 26, which is adapted to be engaged with shoulders 27 on the bars 20 and 21 when the triple-valve piston 10 moves to the right.

In Figs. 1, 2, 3 and 4, when the parts are in the positions shown in the drawings, fluid under pressure from the train-pipe flows through the passages 5, 6, and 7, into the chamber 9 and through the feed-grooves 28 and 29 into the chamber 12, and into the auxiliary reservoir through the opening 3. The brake-cylinder is then in communication with the atmosphere through the passages 4 30 31, port 32, the cavity 33 in the slide-valve 17, the port 34 in the seat of the slide-valve, and the exhaust-passage 35, which opens to the atmosphere through the nozzle 36. (Shown in Fig. 2.) The port 37, through which fluid under pressure is admitted from the auxiliary reservoir to the brake-cylinder, is then closed by the valve 17, as shown, and the service-port 38 in the slide-valve is closed by the graduating-valve 39. The graduating-valve 39 is a small slide-valve which is loosely fitted between the shoulders on the bars 20 and 21, and is adapted to be moved so as to uncover the port 38 in making service applications before the main valve 17 is moved.

A supplemental piston 40 is fitted in a chamber 41, and is provided with a stem 42, on the end of which is secured an arm or plate 43, which projects through an opening 45 into the main valve-chamber 12 above a pin 44, which is formed on or secured to the arm 23 of the lever 24. The chamber 41 below the piston 40 is always in communication with the train-pipe through the passages 46, 6, 5 and 2, and the other end of the chamber 40, or that portion of it above the piston 40, is in communication with the chamber 12 and the auxiliary reservoir through the passage around the stem 42 and through the opening 45 in which the arm or plate 43 is located. If it is preferred that the stem 42 shall fit closely in the opening through which it passes, the stem 42 may be grooved, as indicated by the dotted line 47 in Fig. 2, or a separate passage may connect the chamber 12 with the chamber 42 above the piston 40.

A stem 48 on the lower side of the piston 40 is fitted to slide in a recess or socket 49, formed in the cap 50, which closes the lower end of the chamber 41. A spring 51, surrounding the stem 48, tends to hold the piston 40 in the position shown in the drawings when the brakes are released and during a service application of the brakes; but when a sufficiently great and rapid reduction of train-pipe pressure is made the resistance of the spring will be overcome by the auxiliary-reservoir pressure acting on the upper side of the piston 40, and the piston 40 will be moved down until it rests on the annular projection 52 of the cap 50.

When a comparatively slight or gradual reduction of train-pipe pressure is made for the purpose of effecting a service application of the brakes, the piston 10 will be moved to the right and with it the graduating-valve 39, thereby uncovering the port 38 in the main valve. The lever 24, by the contact of its arm 22 with the shoulder 26 on the main valve, will be moved on its pivot relative to the bars into the position indicated by the dotted lines in Fig. 1, the shoulders 27 on the bars 20 and 21 will come in contact with the shoulder 26 on the main valve, and as the piston 10 moves over the remainder of its stroke the main valve 17 will be moved to the right until the piston 10 bears against the gasket 53. The first portion of the movement of the main valve will close the exhaust-port 34, and thus close communication between the brake-cylinder and the atmosphere, and the further movement of the main valve will cause the port 38 in the main valve to register with the port 37 in the bushing 19, and fluid under pressure will flow from the auxiliary reservoir to the brake-cylinder and apply the brakes. The position of the main valve is then such that the cavity 33 in the main valve lies wholly to the left of the passage 11, and the passage 11 and port 33 are separated by the lower portion of the wall 54 of the main valve. When a sufficiently great and rapid reduction of train-pipe pressure is made for the purpose of effecting an emergency application of the brakes, the auxiliary-reservoir pressure, acting on the upper side of the piston 40, will overcome the resistance of the spring 51 and the reduced train-pipe pressure, acting on the other side of the piston 40, and the piston 40 will be moved down to the limit of its stroke. At the same time the arm or plate 43 on the stem of the piston 40 will be moved down, so as to prevent any upward movement of the pin 44, which projects from the arm 23 of the lever 24. The lever 24 will thus be prevented from turning and its arm 22 will be held in position against the shoulder 26 on the main valve. The same reduction of pressure will cause the piston 10 to be moved to the right to the limit of its stroke, and the lever 24 being prevented from turning on its pivot the arm 22 of the lever will move the main valve to the right far enough to connect the passage 11 with the port 32 through the cavity 33. The fluid under pressure in the passage 11 will flow to the brake-cylinder through the cavity 33, port 32, and passages 31, 30, and 4. The reduction of pressure in the passage 11 will permit the train-pipe pressure to lift the check-valve 13, and fluid under pressure will flow from the train-pipe through passages 11, 33, 32, 31, 30, and 4 to the brake-cylinder. At the same time the left-hand end of the main valve will have uncovered the port 37, and fluid under pressure will flow from the auxiliary reservoir to the brake-cylinder. When the train-pipe pressure has equalized with the brake-cylinder pressure, or nearly so, the spring 14 and the back-pressure from the brake-cylinder will close the check-valve, and the flow from the auxiliary reservoir to the brake-cylinder will continue until the brake-cylinder and auxiliary-reservoir pressures have equalized.

It is immaterial which one of the pistons, 10 or 40, moves first in making an emergency application, as the result will be the same in either case. If the piston 40 should move before the triple-valve piston, the arm or plate 43 will move down so as to prevent the lever from turning, and the movement of the piston 10 to the right will then cause the pin 44 to slide along on the under side of the arm or plate 43, so that the arm 22 of the lever will be held at the angle shown in Fig. 1, and the main valve will be given its full movement to the right so as to connect the passage 11 with the port 32 and release the fluid from the train-pipe to the brake-cylinder. If the triple-valve piston 10 should move first, the lever 24, by the contact of its arm 22 with the shoulder 26 on the main valve, will at first be turned into the position indicated by the dotted lines in Fig. 1. The main valve will be moved a part of its stroke to the right by the contact of the shoulders 27 with the shoulder 26 on the main valve, and when the piston 40 moves down the arm or plate 43 will move down and by depressing the pin 44 turn the lever into the position shown in Fig. 1, and thereby give a further movement to the main valve so as to connect the passage 11 with the port 32.

It will be seen that if the piston 10 makes its full stroke to the right, the downward movement of the piston 40 will cause the main valve to be moved into the emergency position, whether the movement of the piston 40 occurs before, during, or after the movement of the piston 10.

If preferred, that portion of the triple-valve stem to which the lever 24 is pivoted, instead of being constructed as shown, may be formed of one solid piece and provided with a slot to permit the movement of the lever 24, and the position and arrangement of the piston 40 and its stem 42 may be varied without departing from my invention. For example, the supplemental piston 40 may be so located as to have a movement in the same direction as the movement of the triple-valve piston, or in the opposite direction; or the supplemental piston may be positively connected with the lever, or so connected as to permit some movement of the lever independent of the movement of the supplemental piston.

In Figs. 7, 8, 9, and 10 I have shown the supplemental piston connected to the lever; in Figs. 7 and 8 by means of a yoke or slotted head on the stem of the supplemental piston; in Fig. 9 by means of a link which is pivoted to the lever at one end and to the stem of the supplemental piston at the other end, and in Fig. 10 by means of a pin which passes through a slot in one end of the lever.

In Fig. 9 the triple-valve piston 10 and the supplemental piston 40 move in opposite directions, and in Fig. 10 they move in the same direction to effect an emergency application of the brakes.

In Figs. 7 and 8 the construction is the same as that shown in Figs. 1 and 2, except that the plate or head 43 on the end of the stem 42 of the supplemental piston is provided with a yoke 58, by which the lever 24 is at all times connected with the stem 42 of the supplemental piston. The pin 44 on the lever 24 passes through the slot in the yoke 58 and is adapted to slide therein as the triple-valve piston moves back and forth.

In Fig. 9 the lever 24 is connected with the stem 42 of the supplemental piston 40 by means of a link 69, which is pivoted at one end to the lever and at the other end to the stem 42 of the supplemental piston. The casing 1 of the triple-valve device is shown in place on the head 60 of the brake-cylinder, a part only of the brake-cylinder head being shown in the drawings.

Fluid from the train-pipe flows through the passages 5 and 6$^a$ into the piston-chamber 9, and through the feed-groove 28 around the edge of the piston 10 into the space 61. The space 61 communicates, through a passage 62, (shown in dotted lines,) with a chamber 63, which is formed in the brake-cylinder head, and which is in open communication with the auxiliary reservoir.

The main slide-valve 17 and the graduating-valve 73 are similar in construction to the main slide-valve and graduating-valve which are usually employed in the Westinghouse air-brake system, except that in Fig. 9 the graduating-valve is loosely connected to the main valve by means of a pin 74, which passes through the main valve and through a slot 75 in the stem of the graduating-valve, the slot 75 being of sufficient length to permit the opening movement of the graduating-valve.

The triple-valve piston 10 is provided with a tubular extension 64, which is so fitted in the bushing 19 as to slide easily therein and at the same time to prevent as far as possible the passage of fluid around it. The length of the tubular extension 64 is such that the full stroke of the piston 10 to the right is not sufficient to withdraw the tubular extension entirely from the bushing 19, and the tubular extension serves at all times to prevent the passage of fluid from the space 61 into the chamber 12.

Fluid from the auxiliary reservoir is admitted to the main valve-chamber 12 through the passage 65, which opens at one end into the chamber 12 and at the other end into the passage 62. The capacity of the passage 65 is about equal to or a little greater than the capacity of the passage through the slide-valve which is controlled by the graduating-valve.

The chamber 41, in which the supplemental piston 40 is located, communicates at one end with the train-pipe through the passage 46 and at the other end with the auxiliary reservoir through the passages 66 and 62, so that the supplemental piston is at all times exposed on one side to train-pipe pressure and on the other side to the pressure in the auxiliary reservoir.

In the drawings the parts are in the positions which they will occupy when the brakes are released.

In making a service application of the brakes the piston 10 will make its full stroke to the right, the supplemental piston will remain stationary, the lower arm 22 of the lever 24, which projects into a slot 67 in the stem of the graduating-valve, will move to the right, unseat the graduating-valve, and move the slide-valve so as to close communication between the port 68 and the exhaust-port 34 and open communication between port 68 and the port 38 in the slide-valve. Fluid from the auxiliary reservoir will then flow into the brake-cylinder through the passage 72 in the main valve, (shown in dotted lines,) through the passage 38, port 68, and passages 70 and 71, and the brakes will be applied. The flow from the auxiliary reservoir into the brake-cylinder will continue until the auxiliary-reservoir pressure is reduced a little below the pressure in the train-pipe, when the piston 10 will move to the left and the arm 22 of the lever 24 will also move to the left and seat the graduating-valve. When a sufficiently great and rapid reduction of train-pipe pressure is made to effect an emergency application of the brakes, the triple-valve piston 10 will make its full stroke to the right, the supplemental piston 40 will be moved its full stroke to the left by the auxiliary-reservoir pressure acting on one side of the piston against the reduced train-pipe pressure and the pressure of the spring 51, the lower arm 22 of the lever 24 will be moved farther to the right than in service applications, and this further movement of the arm 22 will move the end of the main valve to the right of the large port 68, thereby quickly opening a large passage from the chamber 12 to the brake-cylinder. On account of the small size of the passage 65, which is the only passage through which fluid is admitted from the auxiliary reservoir into the chamber 12, except by leakage, the opening of the large port 68 will cause a great and sudden reduction of pressure in the chamber 12 and in the passage 11, and the fluid in the train-pipe will unseat the check-valve 13 and flow through the passage 11, chamber 12, port 68, and passages 70 and 71 into the brake-cylinder until the train-pipe pressure has nearly equalized with the brake-cylinder pressure, when the check-valve 13 will close and fluid from the auxiliary reservoir will flow through the passage 65, chamber 12, port 68, and passages 70 and 71 into the brake-cylinder until the reservoir and brake-cylinder pressures have equalized.

In the construction shown in Fig. 10 the lever 24 is pivoted at one end to the stem of the triple-valve piston 10, and at the other end it is connected to the stem 42 of the supplemental piston 40, by means of a pin 77 passing through a slot 76 in the end of the lever. The lever passes through a slot 67 in the stem of the graduating-valve 73, and the graduating-valve is loosely connected with the main valve 17, by means of a pin 74 passing through a slot 75, as in Fig. 9. The main valve-chamber 12 is in open communication with the auxiliary reservoir through the large port 3, as in Figs. 1, 5, and 7, and the triple-valve piston-chamber 9 and the supplemental piston-chamber 41 are in open communication with the train-pipe 2 through the passage 6$^a$.

When a gradual reduction of train-pipe pressure is made for the purpose of effecting a service application of the brakes, the supplemental piston 40 will remain stationary, the triple-valve piston 10 will move to the limit of its stroke to the right, and the upper end of the lever 24 will move far enough to the right to unseat the graduating-valve, close communication between the port 37 and the exhaust-port 34, (shown in Fig. 12,) and put the port 38 in the main valve in communication with the port 37 in the valve-seat. Fluid from the auxiliary reservoir will then flow through the passage 72 in the main valve, (shown in dotted lines,) through the passage 38 in the main valve, and through the port 37 and passages 31, 30, and 4 to the brake-cylinder.

In making an emergency application both the triple-valve piston 10 and the supplemental piston 40 will move to the limits of their strokes to the right, the reduction of train-pipe pressure being sufficiently great and rapid to permit the reservoir-pressure acting on one side of the supplemental piston to overcome the reduced train-pipe pressure and the pressure of the spring 51. The movement of the supplemental piston and the lower end of the lever 24 will cause the main valve to be moved farther to the right than in service applications, and the cavity 33 in the main valve will connect the passage 11 with the port 32, the fluid under pressure in the passage 11 will escape into the brake-cylinder, the reduction of pressure in the passage 11 will permit the train-pipe pressure to unseat the check-valve 13, and fluid under pressure will flow from the train-pipe through the passage 11, the cavity 33 in the main valve, the port 32, and passages 31, 30, and 4 to the brake-cylinder, until the train-pipe pressure has nearly equalized with the brake-cylinder pressure, when the check-valve will close. Fluid under pressure will continue to flow from the auxiliary reservoir to the brake-cylinder through the port 37, which, in emergency applications, is uncovered by the end of the main valve.

My invention is not limited to a construction in which a single valve or an integral valve structure is employed for the admission of fluid to and its release from the brake-cylinder, as it will be obvious that my invention may be employed in connection with a triple-valve device in which the valve controlling the exhaust of fluid from the brake-cylinder is separate from the valve controlling the admission of fluid from the auxiliary reservoir to the brake-cylinder. It is also obvious that the same mechanism which is employed for releasing fluid from the train-pipe through the passage 11 may be employed to control the release of fluid from a supplemental reservoir to the brake-cylinder, or elsewhere, by connecting the passage 11 with a supplemental reservoir.

Instead of releasing the fluid from the passage 11 to the brake-cylinder it may be released to the atmosphere, or elsewhere. The port or passage 32 will then be separated from the passage 31 by a wall 55, (shown in Fig. 5,) and the fluid released through the port 32 will pass out through an opening 56. With this arrangement a port 57 (shown in Fig. 6) will be formed in the valve-seat and serve to connect the passage 31 with the cavity 33 in the main valve for the purpose of releasing the brakes.

In the constructions shown in Figs. 9 and 10, as well as in the other constructions shown and described, it matters not whether the supplemental piston or the triple-valve piston moves first in making emergency applications. The supplemental piston may make its full stroke either before or after the triple-valve piston makes its stroke, or the two pistons may move together.

The movement of the supplemental piston is, in each of the constructions shown, independent of the movement of the triple-valve piston. In the constructions shown in Figs. 9 and 10 this feature is of importance, for the reason that if the triple-valve piston should fail to operate in emergency applications, or when a sufficient reduction of train-pipe pressure is made to operate the supplemental piston, the supplemental piston, in making its full stroke, will move the valve 17 into position to cut off the exhaust from the brake-cylinder and to open communication from the auxiliary reservoir to the brake-cylinder, and thereby effect a service application of the brakes.

If the triple-valve piston remains stationary while the supplemental piston is making its stroke, with the construction shown in Figs. 9 and 10, the movement of the supplemental piston will cause the lever 24 to unseat the graduating-valve and move the valve 17 to the right, to cut off communication between the ports 68 and 34, (shown in Fig. 9,) or the ports 37 and 34, (shown in Figs. 10 and 12,) and the further movement of the supplemental piston to the end of its stroke will cause the port 38 in the valve 17 to register with the port leading to the brake-cylinder— that is, the port 68 in Fig. 9 or the port 37 in Fig. 10. Fluid from the auxiliary reservoir will then flow to the brake-cylinder and the brakes will be applied as in service applications.

With the construction shown in Fig. 5, when the fluid from the train-pipe is released to the atmosphere in emergency applications of the brakes, I employ means (not shown) for closing the exhaust-port 56 and limiting the exhaust from the train-pipe, but my present invention is not limited to any special means for this purpose. In my pending application, Serial No. 555,780, I have shown, described and claimed a device for controlling and limiting the exhaust of fluid from the train-pipe after the opening of the release-valve, which may be employed in combination with the construction shown in Fig. 5, or with a similar construction, and in view of the claims made in that application it is not deemed advisable to illustrate that device in this application.

In Figs. 1, 5 and 7 I have shown a stop 78 projecting above the valve-seat in position to limit the inward movement of the slide-valve. If preferred a plug, or small screw-threaded bolt 79, (shown in dotted lines,) may be inserted through the side of the casing and through the bushing in such position that the inner end of the flange or wing 80 on the main valve 17 will abut against it when the main valve moves to the left a short distance beyond its proper position for releasing the brakes. So long as the main valve 17 is in contact with the shoulder 16 on the piston-rod 15, the main valve cannot come in contact with the stop 78 or 79. The stop is intended only to prevent the valve from moving inward beyond the proper position for releasing the brakes.

I claim as my invention and desire to secure by Letters Patent—

1. In an automatic fluid pressure brake system, the combination, with a valve controlling the local release of fluid from the train pipe, of a triple valve piston, a supplemental piston outside of the triple valve piston, and means connected to the triple valve piston in position to be actuated by the supplemental piston so as to operate the valve, substantially as set forth.

2. In an automatic fluid pressure brake system, the combination, with a valve controlling the release of fluid from the train pipe, of two separate pistons whose movements are effected independently of each other and means interposed between both pistons and the valve, whereby the movement of both pistons will actuate the valve, substantially as set forth.

3. The combination in a triple valve device of a valve operated by the triple valve piston in service applications of the brakes, and a supplemental piston which is immovable by the triple valve piston and whose operation causes a movement of the main valve into position to effect an emergency application of the brakes, substantially as set forth.

4. The combination in a triple valve device of a triple valve piston, a supplemental piston which is separate from and outside of the triple valve piston, and a valve which is operated in service applications by the triple valve piston only, and in emergency applications by both pistons, substantially as set forth.

5. The combination, in a fluid pressure brake system, with a triple valve piston, and a supplemental piston which is separate from and outside of the triple valve piston, of a valve which is operated by the triple valve piston to release fluid under pressure from the auxiliary reservoir, and by both pistons to release fluid under pressure from another source of pressure, substantially as set forth.

6. The combination, with a triple valve piston and a valve actuated thereby, of a pivoted lever, or crank, connected to the triple valve piston, and a supplemental piston for actuating the lever or crank to effect an emergency application of the brakes.

7. The combination of a triple valve piston, a supplemental piston, whose movement effects an emergency application of the brakes, and a pivoted lever or crank connected to one of the pistons and operated by the other piston to impart opening movement to a valve, substantially as set forth.

8. The combination of a chamber or casing having direct connections to a brake cylinder and to a train pipe, a valve controlling communication between said connections, and a piston connected to the triple valve piston, whose movements are independent of the triple valve piston, and which is actuated by a reduction of train pipe pressure to effect opening movement of the valve, substantially as set forth.

9. The combination, with a triple valve device, of a supplemental piston for releasing fluid under pressure from the train pipe and whose movement is adapted to close communication between the brake cylinder and the atmosphere independently of the movement of the triple valve piston, substantially as set forth.

10. The combination, with a triple valve device, of a supplemental piston for releasing fluid under pressure from the train pipe and which is actuated by a reduction of train pipe pressure to close communication between the brake cylinder and the atmosphere and to effect an application of the brakes, substantially as set forth.

11. The combination of a chamber or casing having connections to a brake cylinder and to an auxiliary reservoir, a valve controlling communication between said connections, and a piston connected to the triple valve piston, and which is actuated by a reduction of train pipe pressure to open communication between the auxiliary reservoir and the brake cylinder independently of the movement of the triple valve piston, substantially as set forth.

12. The combination with a triple valve device, of a quick action device for locally venting the train pipe in emergency applications of the brakes and means whereby the quick action device may effect a service application of the brakes independently of the movement of the triple valve piston, substantially as set forth.

13. The combination, with a triple valve device, of a supplemental piston by whose movement fluid under pressure may be released from the train pipe, and means whereby the movement of the supplemental piston, independent of the triple valve piston, may effect a service application of the brakes, substantially as set forth.

14. The combination, with a triple valve device, of a supplemental piston by whose movement fluid under pressure may be released from the train pipe, and means whereby the movement of the supplemental piston, independent of the triple valve piston may cut off communication between the brake cylinder and the atmosphere and effect a service application of the brakes, substantially as set forth.

15. The combination, with a triple valve device, of a supplemental piston, and connections from the triple valve piston and from the supplemental piston to a valve controlling communication from the auxiliary reservoir to the brake cylinder, whereby the movement of the triple valve piston or the supplemental piston may effect an application of the brakes, substantially as set forth.

In testimony whereof I have hereunto set my hand.

THOMAS J. HOGAN.

Witnesses:
  J. SNOWDEN BELL,
  F. E. GAITHER.